US011457203B2

(12) United States Patent
Huang et al.

(10) Patent No.: US 11,457,203 B2
(45) Date of Patent: Sep. 27, 2022

(54) DISPLAY APPARATUS USING SIGHT DIRECTION TO ADJUST DISPLAY MODE AND OPERATION METHOD THEREOF

(71) Applicant: Acer Incorporated, New Taipei (TW)

(72) Inventors: Shih-Ting Huang, New Taipei (TW); Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/183,300

(22) Filed: Feb. 23, 2021

(65) Prior Publication Data

US 2022/0103805 A1 Mar. 31, 2022

(30) Foreign Application Priority Data

Sep. 25, 2020 (TW) ................................. 109133390

(51) Int. Cl.
*H04N 13/383* (2018.01)
*G06T 7/73* (2017.01)
*H04N 13/398* (2018.01)
*H04N 13/359* (2018.01)

(52) U.S. Cl.
CPC ............ *H04N 13/383* (2018.05); *G06T 7/73* (2017.01); *H04N 13/359* (2018.05); *H04N 13/398* (2018.05); *G06T 2207/30201* (2013.01)

(58) Field of Classification Search
CPC ........... A61B 5/398; A61B 3/113; A61B 3/14; A61B 5/6803; A61B 3/10; A61B 3/024; A61B 5/14555; A61B 3/13; G02B 27/0172; G02B 2027/0138; G02B 27/0179; G02B 27/0093; G02B 27/017; G06F 3/013; G06T 19/006; G06K 9/00604
See application file for complete search history.

(56) References Cited

U.S. PATENT DOCUMENTS

| 8,564,533 | B2 | 10/2013 | Yuan | |
|---|---|---|---|---|
| 2011/0103680 | A1* | 5/2011 | Mashitani | H04N 13/296 382/154 |
| 2016/0262608 | A1* | 9/2016 | Krueger | G06T 19/006 |

FOREIGN PATENT DOCUMENTS

| CN | 106657717 | 5/2017 |
|---|---|---|
| CN | 110623629 | 12/2019 |
| CN | 111684394 | 9/2020 |
| EP | 2362261 | 8/2011 |
| TW | 202009648 | 3/2020 |

\* cited by examiner

*Primary Examiner* — Farhan Mahmud
(74) *Attorney, Agent, or Firm* — JCIPRNET (57) ABSTRACT

A display apparatus and an operation method thereof are provided. The display apparatus includes a 3D display module, a camera, and a processing circuit coupled to the 3D display module and the camera. The camera is configured to shoot a viewing field of the 3D display module to generate a photo. The processing circuit is configured to output an image stream to the 3D display module to display a screen, and recognize the photo to obtain a face direction and a sight direction of a person in the viewing field. The processing circuit determines whether to enable a vestibulo-ocular reflex (VOR) compensation mode for the image stream according to the face direction and the sight direction.

12 Claims, 6 Drawing Sheets

DISPLAY APPARATUS USING SIGHT DIRECTION TO ADJUST DISPLAY MODE AND OPERATION METHOD THEREOF

CROSS-REFERENCE TO RELATED APPLICATION

This application claims the priority benefit of Taiwan application serial no. 109133390, filed on Sep. 25, 2020. The entirety of the above-mentioned patent application is hereby incorporated by reference herein and made a part of this specification.

BACKGROUND

Technical Field

The disclosure relates to a display technology, and more particularly, to a display apparatus using a sight direction to adjust a display mode and an operation method thereof.

Description of Related Art

In the conventional 3D display technology, unlike the experience of viewing an actual object, a display screen is not dynamically scaled or changed in accordance with a change in a viewer's point of view. Therefore, in the 3D display technology, it is possible to dynamically scale up or down a 3D object as the viewer's face approaches or moves away from a screen, and it is also possible for the human eye in a fixed gaze position to see the same object on the screen from different angles as the viewer turns their head, thus achieving an interactive experience close to that of viewing the actual object.

A vestibulo-ocular reflex (VOR) mechanism of the human eye is similar to the anti-shake function provided by a lens of a mobile phone for picture taking. The anti-shake function ensures to a certain extent that vibration is reduced when the mobile phone performs image shooting. The vestibulo-ocular reflex of the human eye is one of the fastest and the most active reflexes inside the human body. After a head motion is detected by the inner ear, the vestibulo-ocular reflex controls the eyeball to make a compensatory movement to match the head motion (but the direction of the eye movement is opposite to that of the head motion). Therefore, no matter how hard the head turns, such subconscious continuous eye posture adjustment keeps the human eye in a steady state of gazing.

However, with the existing 3D display technology, abnormal jitter may occur in a 3D screen when the viewer turns their head, and there is a gap between the screen viewed from the left eye, the screen viewed from the right eye, and the perception of the actual object from the human eye. At present, the generation of the 3D screen is only based on image detection of 2D human face landmarks performed through parallel and frontward/backward movements. The technology is not applicable to the case where the head turns up/down or left/right and does not detect an actual gaze position of the eyeball. Therefore, there is an offset between the image as viewed from the left eye and the image as viewed from the right eye and a gap between the 3D screen and the actual perception. As a result, the user may feel dizzy and discomfort, and the user experience greatly deteriorates.

It should be noted that the information in the "Description of Related Art" is to help understand the disclosure. Part of the information (or all of the information) disclosed in the "Description of Related Art" may not be the related art known to those having ordinary skill in the art. The information disclosed in the "Description of Related Art" may not be known to those having ordinary skill in the art before filing of the present application.

SUMMARY

The disclosure provides a display apparatus and an operation method thereof, in which a display operation may be determined according to a face direction and a sight direction.

In an embodiment of the disclosure, a display apparatus is provided. The display apparatus includes a 3D display module, a camera, and a processing circuit. The camera is configured to shoot a viewing field of the 3D display module to generate a photo. The processing circuit is coupled to the 3D display module and the camera. The processing circuit is configured to output an image stream to the 3D display module to display a screen. The processing circuit recognizes the photo to obtain a face direction and a sight direction of a person in the viewing field. The processing circuit determines whether to enable a vestibulo-ocular reflex (VOR) compensation mode for the image stream according to the face direction and the sight direction.

In another embodiment of the disclosure, an operation method of a display apparatus is provided. The operation method includes the following. A viewing field of a 3D display module of a display apparatus is shot by a camera of the display apparatus to generate a photo. An image stream is output by a processing circuit of the display apparatus to the 3D display module to display a screen. The photo is recognized by the processing circuit to obtain a face direction and a sight direction of a person in the viewing field. Whether to enable a VOR compensation mode for the image stream is determined by the processing circuit according to the face direction and the sight direction.

In still another embodiment of the disclosure, a display apparatus is provided. The display apparatus includes a 3D display module, a camera, and a processing circuit. The camera is configured to shoot a viewing field of the 3D display module to generate a photo. The processing circuit is coupled to the 3D display module and the camera. The processing circuit is configured to output an image stream to the 3D display module to display a screen. The processing circuit recognizes the photo to obtain a face direction and a sight direction of a person in the viewing field. The processing circuit determines a field of view of the person according to the face direction and the sight direction. The processing circuit enables a 3D rendering mode for the screen covered by the field of view, and enables a 2D rendering mode for the screen not covered by the field of view.

In yet still another embodiment of the disclosure, an operation method of a display apparatus is provided. The operation method includes the following. A viewing field of a 3D display module of a display apparatus is shot by a camera of the display apparatus to generate a photo. An image stream is output by a processing circuit of the display apparatus to the 3D display module to display a screen. The photo is recognized by the processing circuit to obtain a face direction and a sight direction of a person in the viewing field. A field of view of the person is determined by the processing circuit according to the face direction and the sight direction. A 3D rendering mode is enabled by the processing circuit for the screen covered by the field of view. A 2D rendering mode is enabled by the processing circuit for the screen not covered by the field of view.

Based on the above, in the embodiments of the disclosure, the face direction and the sight direction of a viewer in the viewing field are obtained by photo recognition. In some embodiments, the processing circuit determines whether to enable the VOR compensation mode for the image stream according to the face direction and the sight direction. In other embodiments, the processing circuit determines the field of view of the viewer according to the face direction and the sight direction, and then enables the 3D rendering mode for the screen covered by the field of view, and enables the 2D rendering mode for the screen not covered by the field of view.

In order to make the above features and advantages of the disclosure comprehensible, embodiments accompanied with drawings are described in detail below.

DETAILED DESCRIPTION OF DISCLOSED EMBODIMENTS

The term "coupling (or connection)" as used throughout the present specification (including the claims) may refer to any direct or indirect connection means. For example, if it is described that a first device is coupled (or connected) to a second device, it should be interpreted that the first device can be directly connected to the second device, or the first device can be indirectly connected to the second device through other devices or a certain connection means. The terms "first", "second" and the like as mentioned throughout the present specification (including the claims) are used to name the elements or to distinguish between different embodiments or scopes, rather than setting an upper or lower limit on the number of the elements or the order of the elements. In addition, wherever possible, elements/components/steps with the same reference numerals in the drawings and embodiments represent the same or similar parts. Cross-reference may be made between the elements/components/steps in different embodiments that are denoted by the same reference numerals or that have the same names.

Some of the embodiments of the disclosure will be described in detail with the accompanying drawings. Regarding the reference numerals used in the following description, the same reference numerals appearing in different drawings will be regarded as the same or similar elements. These embodiments are only a part of the disclosure, and do not disclose all possible implementations of the disclosure. More precisely, these embodiments are just examples of the apparatus and the systems within the scope of the claims of the disclosure.

Figure 1:
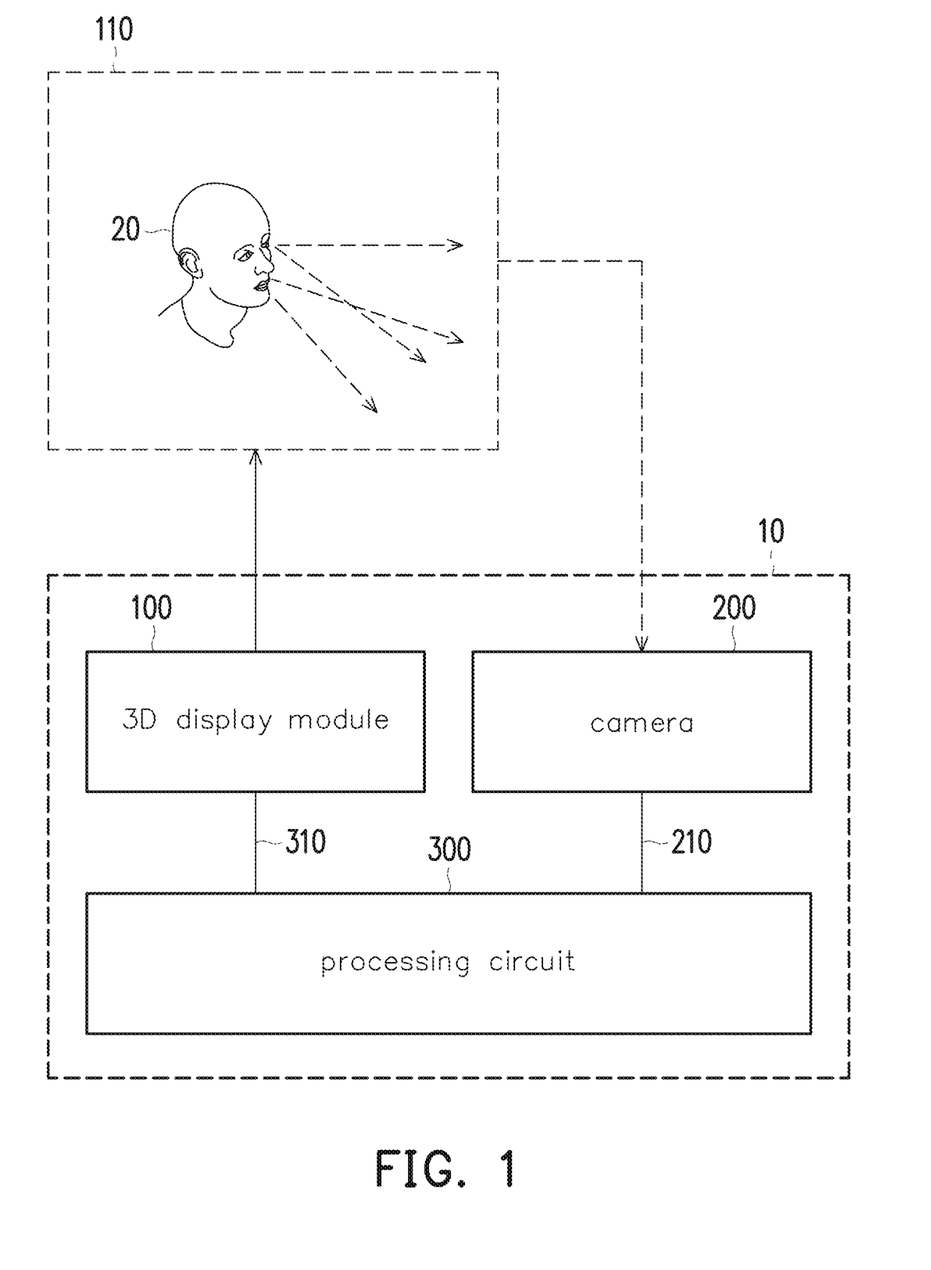
FIG. 1 is a schematic view of a display apparatus according to an embodiment of the disclosure.

FIG. 1 is a schematic view of a display apparatus 10 according to an embodiment of the disclosure. The display apparatus 10 shown in FIG. 1 includes a 3D display module 100, a camera 200, and a processing circuit 300. The processing circuit 300 is coupled to the 3D display module 100 and the camera 200. The processing circuit 300 may output an image stream 310 to the 3D display module 100 to display a screen. A person 20 in a viewing field 110 may view a display screen of the 3D display module 100. According to different design requirements, the 3D display module 100 and/or the processing circuit 300 may be implemented as hardware, firmware, software (that is, programs) or a combination of more than one of the above.

Figure 2:
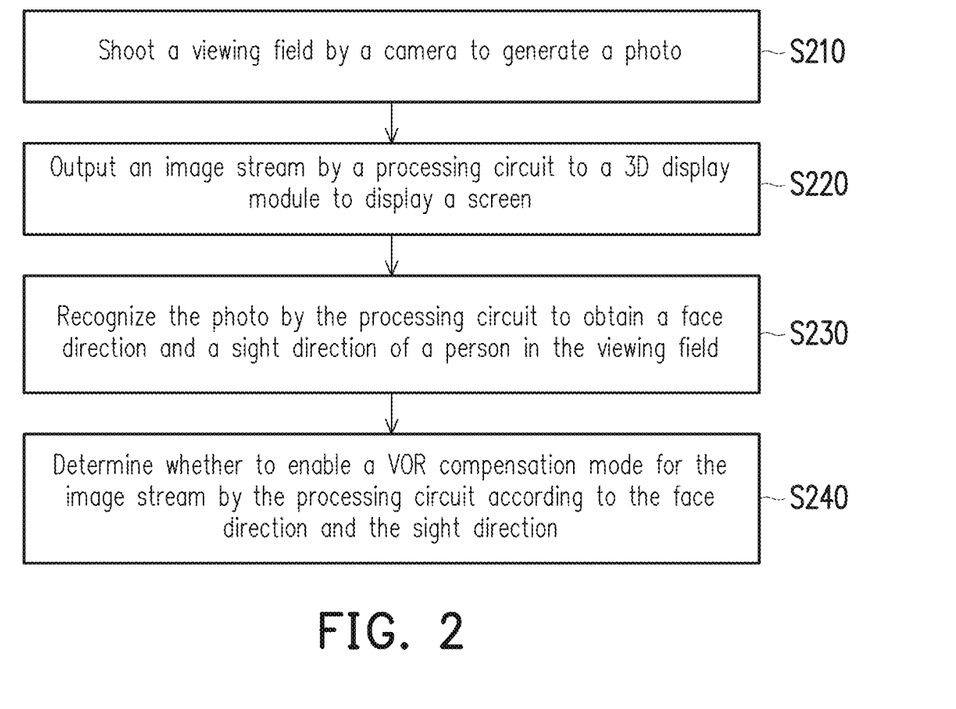
FIG. 2 is a schematic flowchart of an operation method of a display apparatus according to an embodiment of the disclosure.

FIG. 2 is a schematic flowchart of an operation method of a display apparatus according to an embodiment of the disclosure. Referring to FIGS. 1 and 2, in step S210, the camera 200 may shoot the viewing field 110 of the 3D display module 100 to generate a photo 210.

In step S220, the processing circuit 300 of the display apparatus 10 outputs the image stream 310 to the 3D display module 100 to display the screen. According to the design requirements, in some embodiments, the image stream 310 may be an object frame displayed in 3D rendering, or an object frame displayed in 2D rendering. For example, the image stream 310 may be a display frame supporting a vestibulo-ocular reflex (VOR) compensation mode. It should be noted that the order of steps S210 and S220 is not limited. In some implementation scenarios, step S210 and step S220 may be performed simultaneously. In other implementation scenarios, step S220 may be performed earlier (or later) than step S210.

In step S230, the processing circuit 300 may recognize the photo 210 to obtain a face direction and a sight direction of the person 20 in the viewing field 110. The face direction may include a direction of yawing, pitching, or rolling. In some embodiments, the processing circuit 300 may determine a turning direction (face direction) of a user's head according to feature points calculated by the face landmark detection technology. For example, the processing circuit 300 may calculate a center line of the nose, an average center line of the eyes, and an ellipse formed by the chin and the forehead according to the feature points of the face, and detect a change in the shape of the ellipse as a head turning action.

In some embodiments, the processing circuit 300 may further calculate the feature points in an area adjacent to the eye based on the feature points of the face landmark information and obtain a sight direction (eyeball direction). The face direction and the sight direction may be the same direction or different directions.

In step S240, the processing circuit 300 may determine whether to enable the VOR compensation mode for the image stream 310 according to the face direction and the sight direction. According to the design requirements, in the VOR compensation mode, a conventional VOR compensation operation or other VOR compensation operations may be performed. For example, in some embodiments, the VOR compensation mode is enabled when the face direction is different from the sight direction.

Figure 3:
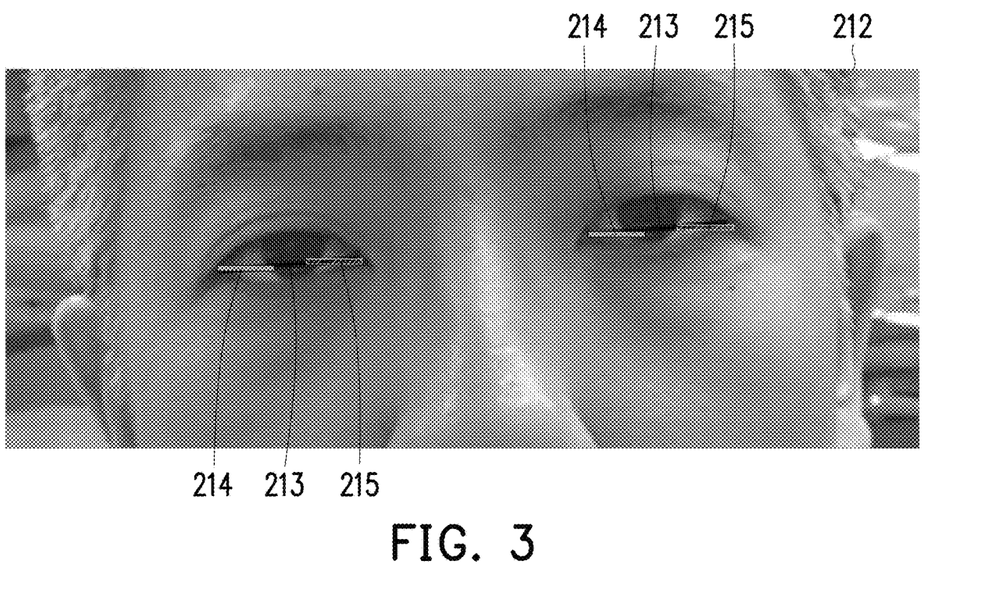
FIG. 3 is a schematic view of an eye image according to an embodiment of the disclosure.

FIG. 3 is a schematic view of recognizing an eye image 212 in the photo 210 according to an embodiment of the disclosure. Referring to FIGS. 1, 2, and 3, in some embodiments, the processing circuit 300 may capture the eye image 212 of the person 20 in the photo 210. The processing circuit 300 may use the eye image to obtain the sight direction of the person 20 in step S230. For example, the processing circuit 300 may recognize the eye image 212 in the photo 210 to obtain a corneal diameter 213, a left corneal distance 214, and a right corneal distance 215. The processing circuit 300 may use at least the corneal diameter 213, the left corneal distance 214, and the right corneal distance 215 to obtain the sight direction of the person 20 in step S230. For example, the sight direction is determined (obtained) by comparing the left corneal distance 214 with the right corneal distance 215 in terms of magnitude. In some embodiments, when the left corneal distance 214 is smaller than the right corneal distance 215, the processing circuit 300 may determine that the sight direction is a right turning direction. That is, the face direction of the person 20 is toward the camera 200 (the 3D display module 100), while the sight direction (eyeball direction) is rightward. In contrast, when the left corneal distance 214 is greater than the right corneal distance 215, the processing circuit 300 may determine that the sight direction is a left turning direction.

In other embodiments, the processing circuit 300 may calculate a ratio of the corneal diameter 213 to the left corneal distance 214 and a ratio of the corneal diameter 213 to the right corneal distance 215, and may determine the sight direction by comparing the ratios obtained by calculation. For example, in some embodiments, when the ratio of the corneal diameter 213 to the left corneal distance 214 is greater than the ratio of the corneal diameter 213 to the right corneal distance 215, the processing circuit 300 determines that the sight direction is a right turning direction. When the ratio of the corneal diameter 213 to the left corneal distance 214 is smaller than the ratio of the corneal diameter 213 to the right corneal distance 215, the processing circuit 300 determines that the sight direction is a left turning direction. When the ratio of the corneal diameter 213 to the left corneal distance 214 is equal to the ratio of the corneal diameter 213 to the right corneal distance 215, the processing circuit 300 determines that the sight direction is straight toward the camera 200 (the 3D display module 100).

Figure 4:
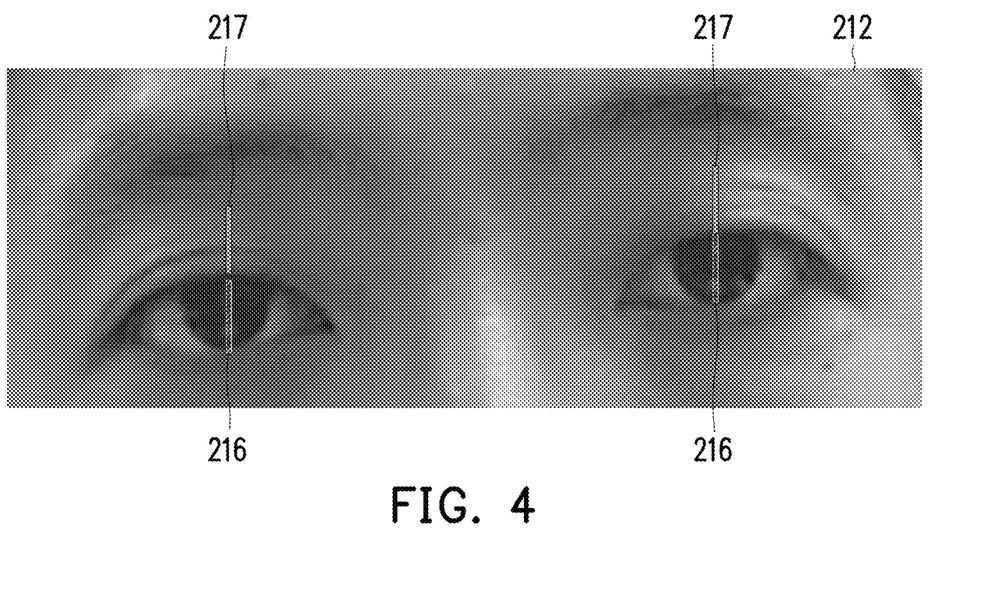
FIG. 4 is a schematic view of an eye image according to another embodiment of the disclosure.

FIG. 4 is a schematic view of the eye image 212 according to another embodiment of the disclosure. Referring to FIGS. 1, and 2, and 4, in some embodiments, the processing circuit 300 may capture the eye image 212 of the person 20 in the photo 210, and the processing circuit 300 may use eye image 212 to obtain the sight direction of the person 20. For example, the processing circuit 300 may recognize the eye image 212 to obtain an eye length 216 and an eyelid length 217. In some embodiments, the eyelid length 217 may be a distance from an edge of an eyelid to an eyebrow. The processing circuit 300 may use at least the eye length 216 and the eyelid length 217 to obtain the sight direction of the person 20. For example, the processing circuit 300 may determine the sight direction according to a change in values of the eye length 216 and the eyelid length 217. In some embodiments, if the eye length 216 is increased while the eyelid length 217 is reduced at the same time, the processing circuit 300 may determine that the sight direction is an upward turning direction. In contrast, if the eye length 216 is reduced while the eyelid length 217 is increased at the same time, the processing circuit 300 may determine that the sight direction is a downward turning direction.

Figure 5:
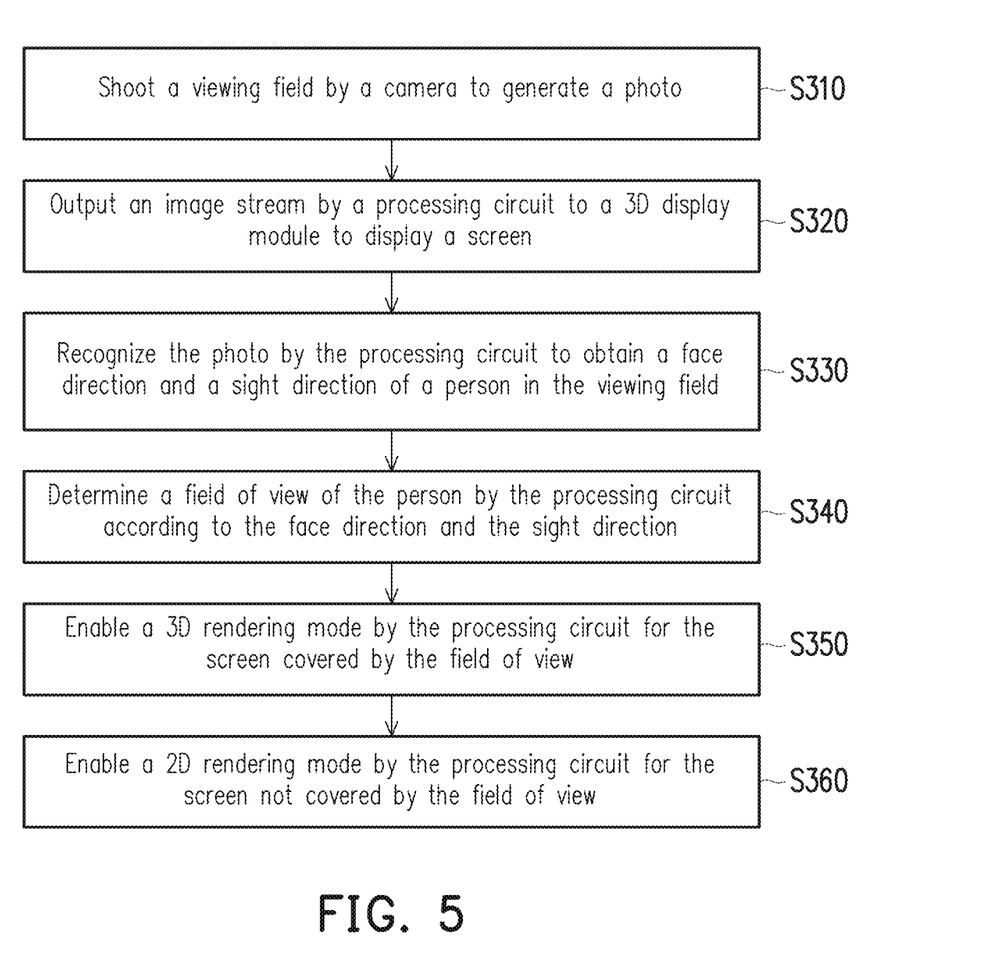
FIG. 5 is a schematic flowchart of an operation method of a display apparatus according to another embodiment of the disclosure.

FIG. 5 is a schematic flowchart of an operation method of a display apparatus according to another embodiment of the disclosure. For steps S310 to S330 shown in FIG. 5, reference may be made to the related descriptions of steps S210 to S230 shown in FIG. 2, so the details are not repeated here. Referring to FIGS. 1 and 5, after the face direction and the sight direction are determined, the processing circuit 300 may further determine a field of view (for example, a field of view 240 shown in FIGS. 6 and 7) according to the face direction and the sight direction in step S340. Specifically, in some embodiments, according to the rules of ergonomics for head turning and sight turning, a maximum range of eyeball rotation is about plus or minus 30 degrees with respect to the face direction. Generally speaking, considering visual comfort of the human eye, when the eye has rotated 15 degrees and still cannot see the target, the head will naturally turn along with the eye. Therefore, the field of view 240 shown in FIGS. 6 and 7 may be determined by the maximum range of sight turning of plus or minus 15 degrees.

The processing circuit 300 may enable a 3D rendering mode for the screen covered by the field of view 240 in step S350 of FIG. 5, and enable a 2D rendering mode for the screen not covered by the field of view 240 in step S360. It should be noted that the order of steps S350 and S360 is not limited. In some implementation scenarios, step S350 and step S360 may be performed simultaneously. In other implementation scenarios, step S360 may be performed earlier (or later) than step S350.

Figure 6:
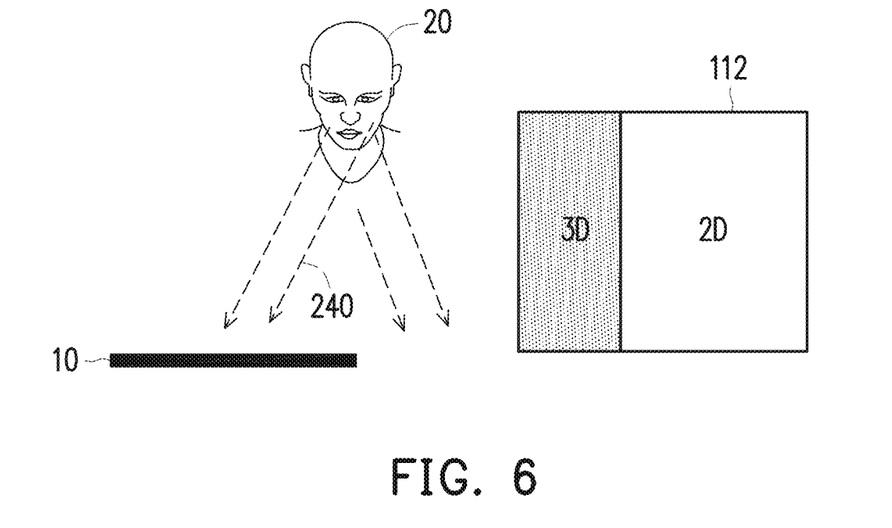
FIG. 6 is a schematic top view of a field of view of a person according to an embodiment of the disclosure.

FIG. 6 is a schematic top view of a field of view of a person according to an embodiment of the disclosure. In the top view shown on the left side of FIG. 6, the field of view 240 covers a part of a screen 112 displayed by the 3D display module 100 of the display apparatus 10. On the right side of FIG. 6 shows a schematic front view of the screen 112 displayed by the display apparatus 10. In the exemplary scenario shown in FIG. 6, the field of view 240 covers a part of a left side of the screen 112. Therefore, the processing circuit 300 may enable the 3D rendering mode for the screen (an area marked as "3D" in the screen 112 shown in FIG. 6) covered by the field of view 240 in step S350, and enable the 2D rendering mode for the screen (an area marked as "2D" in the screen 112 shown in FIG. 6) not covered by the field of view 240 in step S360. It should be noted that the application example shown in FIG. 6 uses the 3D rendering for illustrative purposes, but the implementation of the disclosure is not limited thereto. For example, in some embodiments, the area marked as "3D" in the screen 112 as shown in FIG. 6 may be regarded as an area where the VOR compensation mode is enabled, while the area marked as "2D" in the screen 112 shown in FIG. 6 may be regarded as an area where the VOR compensation mode is disabled.

Figure 7:
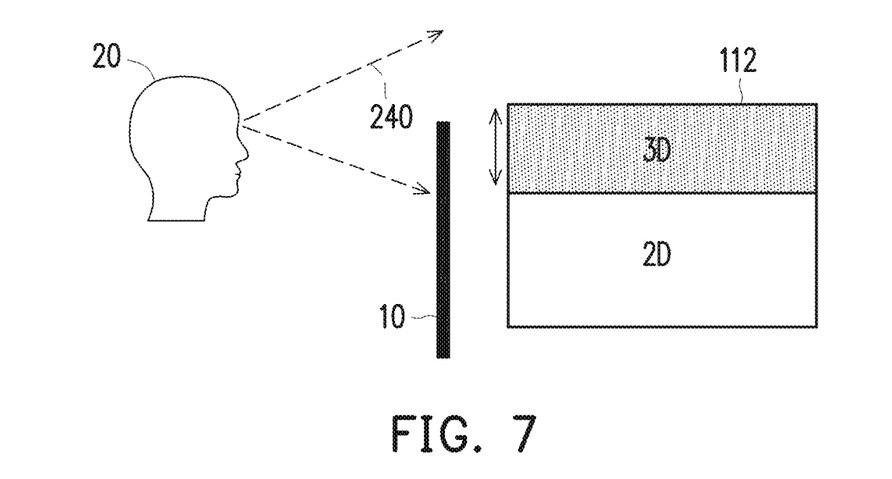
FIG. 7 is a schematic side view of a field of view of a person according to an embodiment of the disclosure.

FIG. 7 is a schematic side view of a field of view of a person according to an embodiment of the disclosure. In the side view shown on the left side of FIG. 7, the field of view 240 covers a part of the screen 112 displayed by the 3D display module 100 of the display apparatus 10. On the right side of FIG. 7 shows a schematic front view of the screen 112 displayed by the display apparatus 10. In the exemplary scenario shown in FIG. 7, the field of view 240 covers a part of an upper side of the screen 112. Therefore, the processing circuit 300 may enable the 3D rendering mode for the screen (an area marked as "3D" in the screen 112 shown in FIG. 7) covered by the field of view 240 in step S350, and enable the 2D rendering mode for the screen (an area marked as "2D" in the screen 112 shown in FIG. 7) not covered by the field of view 240. It should be noted that the application example shown in FIG. 7 uses the 3D rendering for illustrative purposes, but the implementation of the disclosure is not limited thereto. For example, in some embodiments, the area marked as "3D" in the screen 112 as shown in FIG. 7 may be regarded as the area where the VOR compensation mode is enabled, while the area marked as "2D" in the screen 112 shown in FIG. 7 may be regarded as the area where the VOR compensation mode is disabled. The area covered by the field of view 240 may be a range determined by rotation of the field of view 240 of the person 20 in a direction of pitching or yawing, and the disclosure is not limited thereto.

Figure 8:
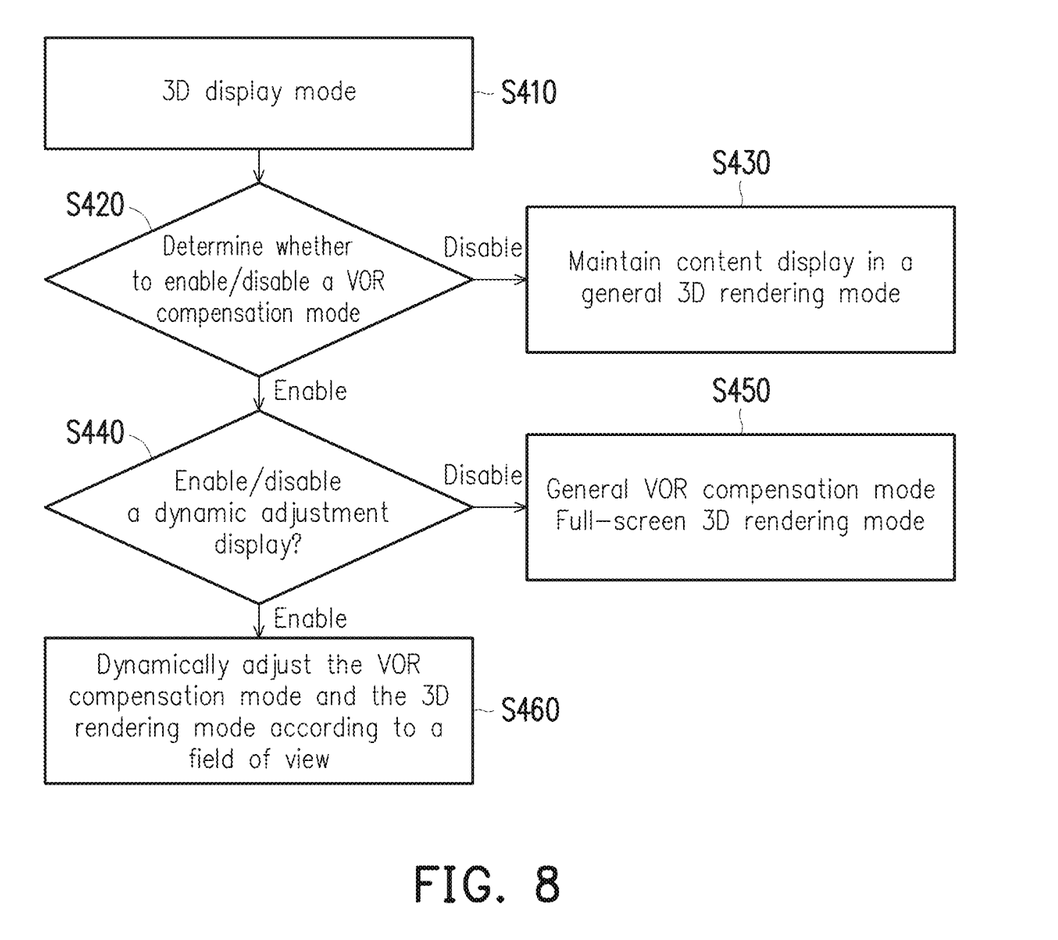
FIG. 8 is a schematic flowchart of an operation method of a display apparatus according to still another embodiment of the disclosure.

FIG. 8 is a schematic flowchart of an operation method of a display apparatus according to still another embodiment of the disclosure. In step S410, the processing circuit 300 may output the image stream 310 to the 3D display module 100 to display the screen 112 (3D display mode). In step S420, the processing circuit 300 may determine whether to enable the VOR compensation mode for the image stream 310 according to the face direction and the sight direction. When the processing circuit 300 determines that the VOR compensation mode is to be disabled (a determination result of step S420 is "disable"), the processing circuit 300 may perform step S430. In step S430, the 3D display module 100 maintains content display in a general 3D rendering mode.

When the processing circuit 300 determines that the VOR compensation mode is to be enabled (the determination result of step S420 is "enable"), the processing circuit 300 may perform step S440. In step S440, the processing circuit 300 further determines whether to enable a dynamic adjustment display according to the field of view 240. The dynamic adjustment display may be understood by analogy with reference to the related descriptions of FIGS. 6 and 7. When the processing circuit 300 determines that the dynamic adjustment display is to be disabled (a determination result of step S440 is "disable"), the processing circuit 300 may perform step S450. In step S450, the 3D display module 100 may perform the general VOR compensation mode and use the 3D rendering mode on the screen 112 in a full-screen manner. That is, the 3D display module 100 may perform the VOR compensation mode on the entire screen 112.

When the processing circuit 300 determines that the dynamic adjustment display is to be enabled (the determination result of step S440 is "enable"), the processing circuit 300 may perform step S460. In step S460, the processing circuit 300 may dynamically adjust the areas of the VOR compensation mode and the 3D rendering mode according to the field of view 240. For example, the processing circuit 300 may enable the VOR compensation mode and the 3D rendering mode for the screen 112 (the area marked as "3D" in the screen 112 shown in FIG. 6 or FIG. 7) covered by the field of view 240, and enable the 2D rendering mode and disable the VOR compensation mode for the screen 112 (the area marked as "2D" in the screen 112 shown in FIG. 6 or FIG. 7) not covered by the field of view 240.

In terms of hardware, the blocks of the 3D display module 100 and/or the processing circuit 300 described above may be implemented in a logic circuit on an integrated circuit. Related functions of the 3D display module 100 and/or the processing circuit 300 may be implemented as hardware using hardware description languages (for example, Verilog HDL or VHDL) or other suitable programming languages. For example, the related functions of the 3D display module 100 and/or the processing circuit 300 may be implemented in one or more controllers, microcontrollers, microprocessors, application-specific integrated circuits (ASICs), digital signal processors (DSPs), field programmable gate arrays (FPGAs), and/or various logic blocks, modules, and circuits in other processing units.

In terms of software and/or firmware, the related functions of the 3D display module 100 and/or the processing circuit 300 may be implemented as programming codes. For example, the 3D display module 100 and/or the processing circuit 300 are implemented by using general programming languages (such as C, C++, or assembly language) or other suitable programming languages. The programming codes may be recorded/stored in a recording medium. In some embodiments, the recording medium includes, for example, a read only memory (ROM), a random access memory (RAM), and/or a storage apparatus. The storage apparatus includes a hard disk drive (HDD), a solid-state drive (SSD) or other storage apparatus. In other embodiments, the recording medium may include a "non-transitory computer readable medium". For example, a tape, a disk, a card, a semiconductor memory, or a programmable logic circuit or the like may be used to implement the non-transitory computer readable medium. A computer, a central processing unit (CPU), a controller, a microcontroller, or a microprocessor may read and execute the programming codes from the recording medium, thereby implementing the related functions of the 3D display module 100 and/or the processing circuit 300. Moreover, the programming codes may also be provided to the computer (or CPU) through any transmission medium (such as a communication network or broadcast wave, etc.). The communication network is, for example, the Internet, a wired communication network, a wireless communication network, or other communication medium.

In summary, in the display apparatus and the operation method thereof described in the foregoing embodiments, the face direction and the sight direction of the person in the viewing field can be obtained by photo recognition. In some embodiments, it can be determined whether to enable the VOR compensation mode, and the field of view can further be determined according to the face direction and the sight direction so as to dynamically adjust display of the 3D rendering mode. By adding this VOR-based auxiliary determination mechanism to an existing simple face landmark-based detection system, it is possible to reduce jitter caused by abnormal switching of the 3D display mode due to failure of detection by the eye when the viewer turns their head or rotates their eye.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A display apparatus, comprising:
    a 3D display module;
    a camera configured to shoot a viewing field of the 3D display module to generate a photo; and
    a processing circuit coupled to the 3D display module and the camera, configured to output an image stream to the 3D display module to display a screen, wherein the processing circuit recognizes the photo to obtain a face direction and a sight direction of a person in the viewing field, and the processing circuit determines whether to enable a vestibulo-ocular reflex compensation mode for the image stream according to the face direction and the sight direction,
    wherein the processing circuit captures an eye image of the person in the photo, and the processing circuit uses the eye image to obtain the sight direction of the person,
    wherein the processing circuit recognizes the eye image to obtain a corneal diameter, a left corneal distance, and a right corneal distance, and the processing circuit uses at least the corneal diameter, the left corneal distance, and the right corneal distance to obtain the sight direction of the person.

2. The display apparatus according to claim 1, wherein the processing circuit recognizes the eye image to obtain an eye length and an eyelid length, and the processing circuit uses at least the eye length and the eyelid length to obtain the sight direction of the person.

3. The display apparatus according to claim 2, wherein the eyelid length is a distance from an edge of an eyelid to an eyebrow.

4. An operation method of a display apparatus, comprising:
shooting a viewing field of a 3D display module of the display apparatus by a camera of the display apparatus to generate a photo;
outputting an image stream by a processing circuit of the display apparatus to the 3D display module to display a screen;
recognizing the photo by the processing circuit to obtain a face direction and a sight direction of a person in the viewing field;
determining whether to enable a vestibulo-ocular reflex compensation mode for the image stream by the processing circuit according to the face direction and the sight direction;
capturing an eye image of the person in the photo by the processing circuit;
using the eye image by the processing circuit to obtain the sight direction of the person;
recognizing the eye image by the processing circuit to obtain a corneal diameter, a left corneal distance, and a right corneal distance; and
using at least the corneal diameter, the left corneal distance, and the right corneal distance by the processing circuit to obtain the sight direction of the person.

5. The operation method according to claim 4, further comprising:
recognizing the eye image by the processing circuit to obtain an eye length and an eyelid length; and
using at least the eye length and the eyelid length by the processing circuit to obtain the sight direction of the person.

6. The operation method according to claim 5, wherein the eyelid length is a distance from an edge of an eyelid to an eyebrow.

7. A display apparatus, comprising:
a 3D display module;
a camera configured to shoot a viewing field of the 3D display module to generate a photo; and
a processing circuit coupled to the 3D display module and the camera, configured to output an image stream to the 3D display module to display a screen, wherein the processing circuit recognizes the photo to obtain a face direction and a sight direction of a person in the viewing field, the processing circuit determines a field of view of the person according to the face direction and the sight direction, the processing circuit enables a 3D rendering mode for the screen covered by the field of view, and the processing circuit enables a 2D rendering mode for the screen not covered by the field of view,
wherein the processing circuit captures an eye image of the person in the photo, and the processing circuit uses the eye image to obtain the sight direction of the person,
wherein the processing circuit recognizes the eye image to obtain a corneal diameter, a left conical distance, and a right corneal distance, and the processing circuit uses at least the conical diameter, the left corneal distance, and the right corneal distance to obtain the sight direction of the person.

8. The display apparatus according to claim 7, wherein the processing circuit recognizes the eye image to obtain an eye length and an eyelid length, and the processing circuit uses at least the eye length and the eyelid length to obtain the sight direction of the person.

9. The display apparatus according to claim 8, wherein the eyelid length is a distance from an edge of an eyelid to an eyebrow.

10. An operation method of a display apparatus, comprising:
shooting a viewing field of a 3D display module of the display apparatus by a camera of the display apparatus to generate a photo;
outputting an image stream by a processing circuit of the display apparatus to the 3D display module to display a screen;
recognizing the photo by the processing circuit to obtain a face direction and a sight direction of a person in the viewing field; and
determining a field of view of the person by the processing circuit according to the face direction and the sight direction;
enabling a 3D rendering mode by the processing circuit for the screen covered by the field of view;
enabling a 2D rendering mode by the processing circuit for the screen not covered by the field of view;
capturing an eye image of the person in the photo by the processing circuit;
using the eye image by the processing circuit to obtain the sight direction of the person;
recognizing the eye image by the processing circuit to obtain a corneal diameter, a left corneal distance, and a right corneal distance; and
using at least the corneal diameter, the left corneal distance, and the right corneal distance by the processing circuit to obtain the sight direction of the person.

11. The operation method according to claim 10, further comprising:
recognizing the eye image by the processing circuit to obtain an eye length and an eyelid length; and
using at least the eye length and the eyelid length by the processing circuit to obtain the sight direction of the person.

12. The operation method according to claim 11, wherein the eyelid length is a distance from an edge of an eyelid to an eyebrow.

* * * * *